United States Patent
Chan et al.

(10) Patent No.: US 11,037,049 B2
(45) Date of Patent: Jun. 15, 2021

(54) DETERMINING RATIONALE OF COGNITIVE SYSTEM OUTPUT

(71) Applicant: INTERNATIONAL BUSINESS MACHINES CORPORATION, Armonk, NY (US)

(72) Inventors: Yuk L. Chan, Rochester, NY (US); Mikhail Flom, Washington, DC (US); Albert S. Jumba, Nairobi (KE); Niraj Kumar, Karnataka (IN); Tejinder Luthra, Leesburg, VA (US); Sue Mallepalle, Sicklerville, NJ (US); Florin-Traian Pistoleanu, Prague (CZ); Goduwin R. Ravindranath, Plano, TX (US); Rekha M. Sreedharan, Kerala (IN); Abraham Sweiss, Durham, NC (US); Sheryl Taylor, Lake Park, GA (US); Hemanth Yarlagadda, Utrecht (NL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 16/173,603

(22) Filed: Oct. 29, 2018

(65) Prior Publication Data
US 2020/0134414 A1    Apr. 30, 2020

(51) Int. Cl.
*G06N 3/00* (2006.01)
*G06N 3/08* (2006.01)
(Continued)

(52) U.S. Cl.
CPC .......... *G06N 3/006* (2013.01); *G06N 3/0427* (2013.01); *G06N 3/08* (2013.01); *G06N 3/084* (2013.01);
(Continued)

(58) Field of Classification Search
CPC ...... G06F 3/0481; G06N 3/006; G06N 3/084; G06N 3/0427; G06N 5/02; G06N 5/045; G06N 3/08; G06N 5/041
See application file for complete search history.

(56) References Cited

U.S. PATENT DOCUMENTS

| 4,658,370 A | 4/1987 | Erman et al. |
| 5,398,300 A | 3/1995 | Levey |

(Continued)

OTHER PUBLICATIONS

D. De Nart et al., "A Personalized Concept-driven Recommender System for Scientific Libraries." Procedia Computer Science, vol. 38, 2014, pp. 84-91.
(Continued)

*Primary Examiner* — Tuyetlien T Tran
(74) *Attorney, Agent, or Firm* — Cantor Colburn LLP; Teddi Maranzano

(57) ABSTRACT

According to one or more embodiments of the present invention, a computer-implemented method includes generating, by a cognitive system, an answer for a user-provided query using an analytics algorithm. The answer is based on a set of data sources. The method further includes determining an influence weightage of each data source from the set of data sources. The method further includes generating and presenting a rationale for the answer based on the influence weightage.

14 Claims, 11 Drawing Sheets

(51) Int. Cl.
  *G06N 3/04* (2006.01)
  *G06N 5/02* (2006.01)
  *G06N 5/04* (2006.01)

(52) U.S. Cl.
  CPC .............. *G06N 5/02* (2013.01); *G06N 5/041* (2013.01); *G06N 5/045* (2013.01)

(56) References Cited

U.S. PATENT DOCUMENTS

| | | | |
|---|---|---|---|
| 6,067,539 A | 5/2000 | Cohen | |
| 7,587,387 B2 | 9/2009 | Hogue | |
| 9,373,086 B1* | 6/2016 | Allen | G06N 5/04 |
| 2010/0299339 A1 | 11/2010 | Kementsietsidis et al. | |
| 2012/0078837 A1* | 3/2012 | Bagchi | G06F 40/134 |
| | | | 706/52 |
| 2012/0231435 A1* | 9/2012 | Mcbride | G09B 7/02 |
| | | | 434/350 |
| 2012/0301864 A1* | 11/2012 | Bagchi | A61B 5/00 |
| | | | 434/362 |
| 2013/0018652 A1 | 1/2013 | Ferrucci et al. | |
| 2016/0012336 A1 | 1/2016 | Franceschini et al. | |
| 2016/0140446 A1* | 5/2016 | Adderly | G06N 5/022 |
| | | | 706/51 |
| 2016/0148093 A1* | 5/2016 | Adderly | G06N 5/022 |
| | | | 706/46 |

OTHER PUBLICATIONS

D. Mcguinness et al., "Trusting Answers on the Web", In New Directions in Question-Answering, Chapter 22, Mark AT. Maybury (ed.), 2004, AAAI/MIT Press, 20 pages.

D. Mcguinness, "Question answering on the semantic Web," in IEEE Intelligent Systems, vol. 19, No. 1, Jan.-Feb. 2004, pp. 82-85.

P. Jansen et al., "Framing QA as Building and Ranking Intersentence Answer Justifications", Association for Computational Linguistics, vol. 43, No. 2, 2017, pp. 407-449.

P. Jansen, "A Study of Automatically Acquiring Explanatory Inference Patterns from Corpora of Explanations: Lessons from Elementary Science Exams." 31st Conference on Neural Information Processing Systems (NIPS 2017), Long Beach, CA, pp. 1-7.

P. Zerva et al., "Towards design support for provenance awareness: a classification of provenance questions." In Proceedings of the Joint EDBT/ICDT 2013, Workshops (EDBT '13). ACM, New York, NY, pp. 275-281.

R. Barzilay et al., "A New Approach to Expert System Explanations." In 9th International Workshop on Natural Language Generation, 1998, pp. 78-87.

T. Goodwin, "Medical Question Answering for Clinical Decisiion Support", In Proceedings of the 25th ACM International Conference on Information and Knowledge Management (CIKM '16), ACM, New York, NY, 2016, pp. 297-306.

W. Swartout et al., "Explanations in knowledge systems: design for explainable expert systems," in IEEE Expert, vol. 6, No. 3, Jun. 1991, pp. 58-64.

\* cited by examiner

US 11,037,049 B2

DETERMINING RATIONALE OF COGNITIVE SYSTEM OUTPUT

BACKGROUND

The present invention relates to computing technology, and particularly a system for determining the rationale of cognitive system output.

The embodiments herein relate to using a question-answering system to support a human expert in problem solving in a particular domain, and more specifically to a decision-support application and system for problem solving using a question-answering system. Decision-support systems exist in many different industries where human experts require assistance in retrieving and analyzing information.

SUMMARY

According to one or more embodiments of the present invention, a computer-implemented method includes generating, by a cognitive system, an answer for a user-provided query using an analytics algorithm. The answer is based on a set of data sources. The method further includes determining an influence weightage of each data source from the set of data sources. The method further includes generating and presenting a rationale for the answer based on the influence weightage.

According to one or more embodiments of the present invention, a system includes a user interface, an answer generator, and a rationale generator. The system performs a method that includes generating, by a cognitive system, an answer for a user-provided query using an analytics algorithm. The answer is based on a set of data sources. The method further includes determining an influence weightage of each data source from the set of data sources. The method further includes generating and presenting a rationale for the answer based on the influence weightage.

A computer program product includes a computer readable storage medium having stored thereon program instructions executable by one or more processing devices to perform a method that includes generating, by a cognitive system, an answer for a user-provided query using an analytics algorithm. The answer is based on a set of data sources. The method further includes determining an influence weightage of each data source from the set of data sources. The method further includes generating and presenting a rationale for the answer based on the influence weightage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
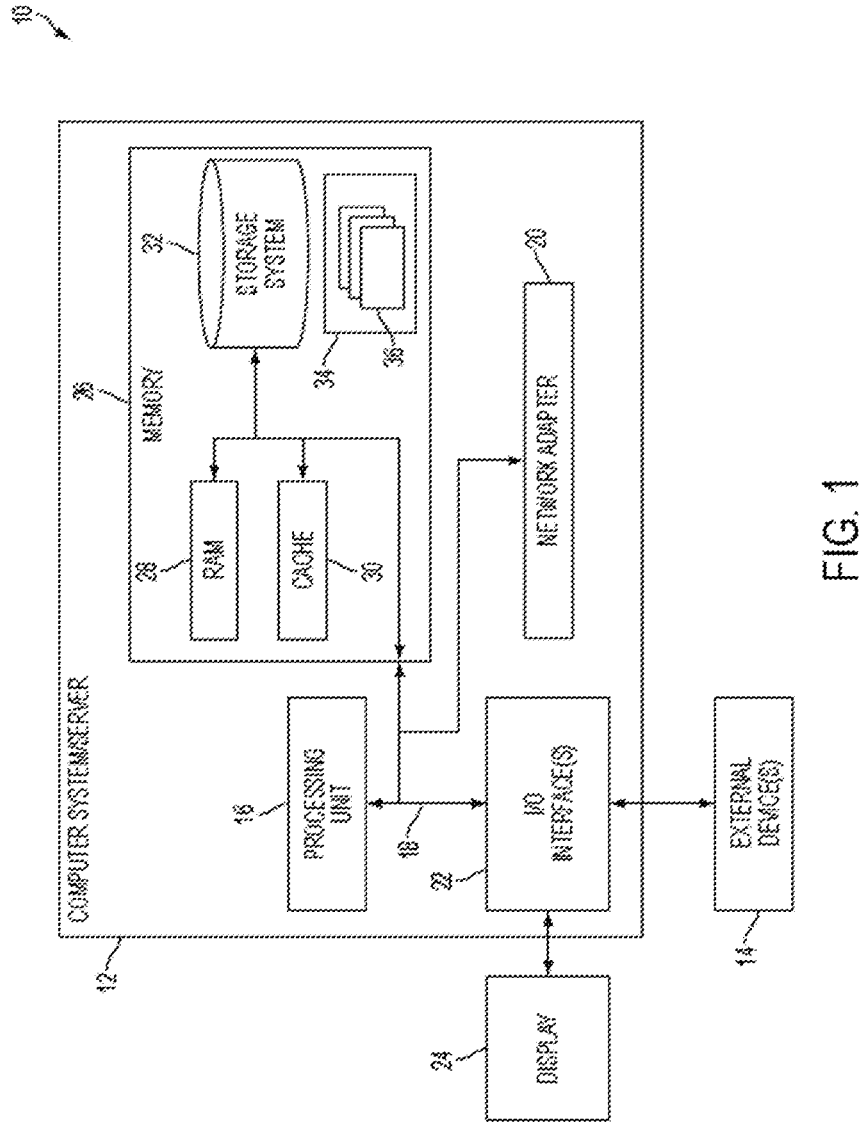
FIG. 1 depicts a cloud computing node according to one or more embodiments of the present invention.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
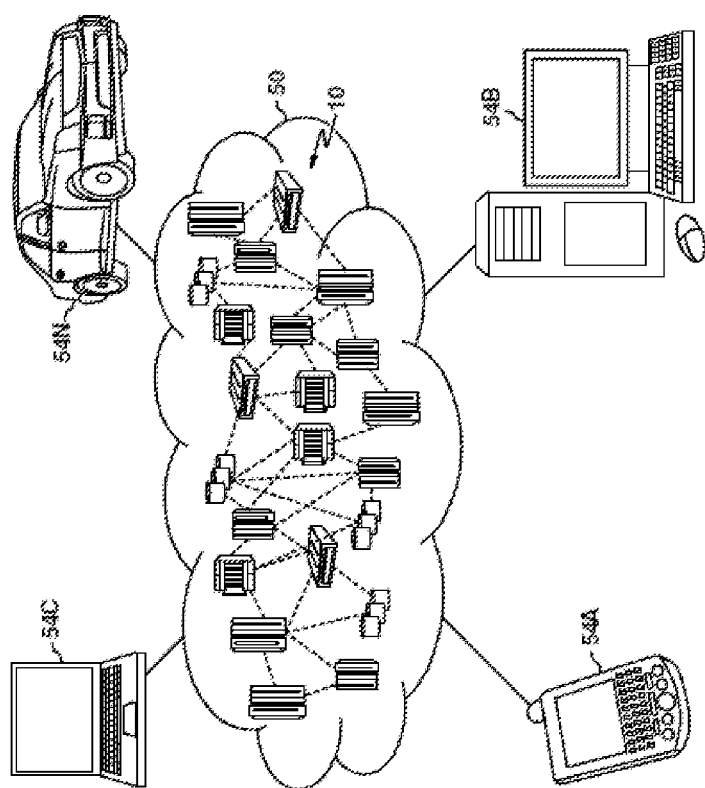
FIG. 2 depicts a cloud computing environment according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
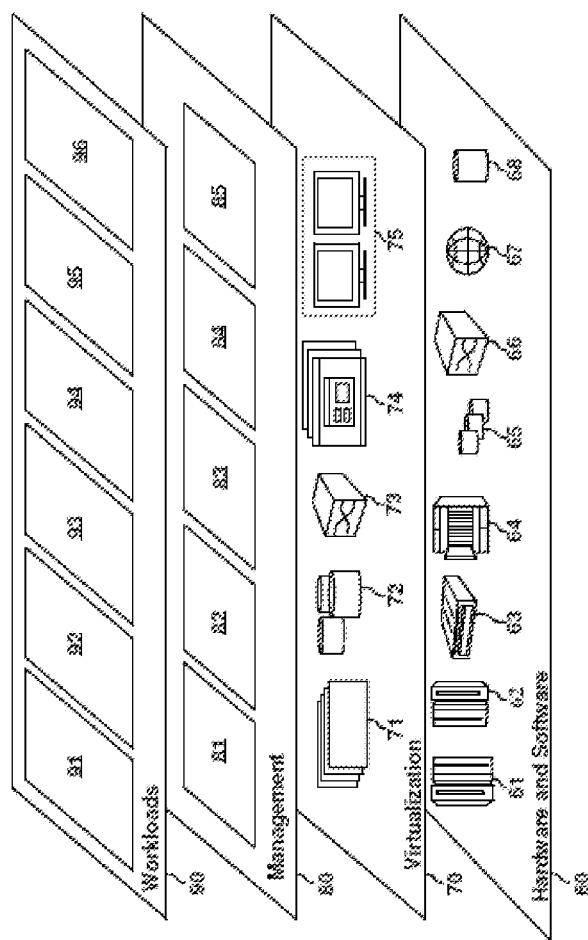
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; cognitive analysis 95; and deep question-answering (Q&A) 96, and the like.

One or more embodiments of the present invention can be used with systems that provide a question-answering application in various domains. The domain can be specific, for example differential diagnosis in the medical domain, or broader ranging, for example a search engine. The objective of the question-answering application is to provide an analytic result (or answer) to a user-provided question based on multiple sources stored in electronic format. Typically, the question-answering application uses many input data (e.g. articles from the Internet, research papers, blogs, social media, list servers, online forums etc.) to generate a result (for prescriptive analytics and/or predictive analytics). Typically, the analytic result is an answer to the user-provided question, and the analytic result does not contain a rationale for such an answer—which is helpful, if not necessary, to help a user (human) understand why/how the question-answering application reached the analytic result as the answer.

The question-answering application/system generates the analytic result using one or more machine learning algorithms and/or artificial neural networks. Typically, a question-answering system, refers to a system that can take an input query expressed in many possible forms, including natural language, structured language or any other means. Note, that an answer need not be limited to be a single "atomic" concept (such as person, place or thing), but may be a complex entity. Some examples of complex entities are elaborate explanations reached through complex reasoning or a sequence of process steps required to achieve the intended goal of the user. Embodiments herein can be applied to a variety of domains involving complex systems that require human experts to solve problems. For example, a detailed explanation is provided for a decision support application targeting differential diagnosis and treatment in the medical domain (as an example of one of many domains). As would be understood by those ordinarily skilled in the art, this system can be used for other complex systems that may not be mentioned/described herein.

Figure 4:
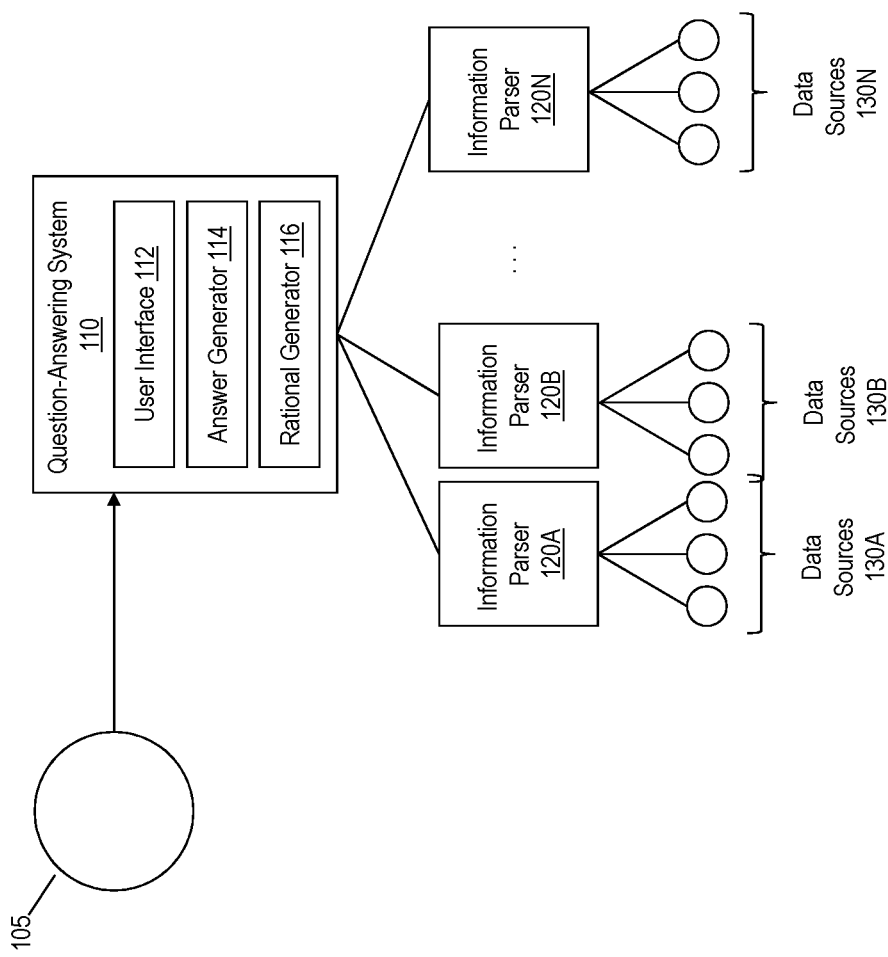
FIG. 4 depicts a block diagram of an example question-answering system according to one or more embodiments of the present invention.

FIG. 4 depicts a block diagram of an example question-answering system according to one or more embodiments of the present invention. In the illustration, a question-answering system 110 includes, among other components, a user interface 112, an answer generator 114, and a rationale generator 116.

A user 105 can interact with the question-answering system 110 via the user interface 112. The user interface 112 can receive one or more questions and other data from the user 105. The user interface 112 can further output one or more results and other data to the user 105. In addition, the user interface 112 can allow interchange of information, such as messages, pop-ups, notifications etc. between the user 105 and the question-answering system 110. The user interface 112 can facilitate communication between the user 105 and the question-answering system 110 in one or more medium, such as audible information, visual information, haptic information, and the like. For example, the user interface 112 can include a display, a keyboard, a mouse, a touchscreen, a microphone, a speaker, a touchpad, a joystick, and any other such input/output device.

Alternatively, or in addition, the user 105 may enter information via the user interface 112 through a range of devices including mobile phones, tablets, computers, appliances, etc. This information can be input through a variety of modalities including spoken, typed, constructed through a series of GUI interactions, etc. The information can be either problem case information or a query (user-provided question). The query can be in the form of natural language, structured language, or any other query format. The problem case information that the system uses can be multimodal and can take the form of text, images, audio, or any other media form.

The answer generator 114 automatically analyzes the query and problem case information in order to identify semantic concepts, relations, and data that are related to the query. The answer generator 114 also automatically generates a plurality of answers for each diagnosis query and calculates confidence values for each of the answers based on numerical values for several dimensions of evidence that are relevant to the problem-solving domain. The answer generator 114 can then automatically calculate corresponding confidence values for each of the answers based on the numerical value of each evidence dimension of evidence sources of the confidence values. The answer generator 114 uses one or more machine learning algorithms and/or artificial neural networks for determining the answer.

In one or more examples, the answer generator 114 determines information relevant to the query from one or more data sources 130. The data sources 130 can include books, articles, journal papers, blogs, forums, and other such information repositories that are in electronic format. In one or more examples, a data source can be a part (not entirety) of one of the data sources described above, for example, a paragraph, a sentence, a section, a figure, and the like. The answer generator 114 can use one or more different information parsers 120 to determine information from the data sources 130. The information parsers 120 can include a summarizer 120A, an information extractor 120B, and other such information parsers.

For example, the summarizer 120A summarizes the information available via one or more data sources 130A to generate a summary of the data sources 130A. Summarizing, in this case, can include rewording, compressing, paraphrasing, and other such syntactic and semantic analysis of the data sources 130. The summary can then be used, either directly, or for further analysis to determine the answer to the query from the user 105.

The information extractor 120B distills one or more portions of information from the one or more data sources 130B. Here, the distilled portions are not modified (e.g. reworded, paraphrased etc.) and used directly either at least a part of the answer.

Further, a rationale generator 116 can then automatically generate links to each item of evidence to allow the user to examine the data sources 130 that justify the answer that is provided to the user 105. For example, links can be generated to the source 130A of a passage, its type (textbook, guideline, journal article, web content, database or structured source). The rationale generator 116 can also output the queries, the answers, the corresponding confidence values, the links to the data sources 130, and the numerical value of each evidence dimension to the user 105.

As will be understood the embodiments herein apply to problem solving in any complex-system domains that require question answering over unstructured material. Examples of such domains include aircraft maintenance (and other vehicles of similar complexity) and information technology support (call centers). This system could be used for automobiles, submarines, or even less complex but likely more universally accessible applications, for example, finding answers to "how to" queries in information technology or suitable meal recipes given input specifications such as ingredients, cost requirements, time, complexity, elegance, etc. These are all characterized by large amounts of structured and unstructured "problem case information" and domain knowledge, and requiring a deep question-answer type technology. Therefore, while the examples herein utilize a medical diagnosis system, those ordinarily skilled in the art would understand that the embodiments herein are applicable to all question-answer systems and the embodiments herein are not limited to just the exemplary domains that are used to illustrate the embodiments herein.

Figure 5:
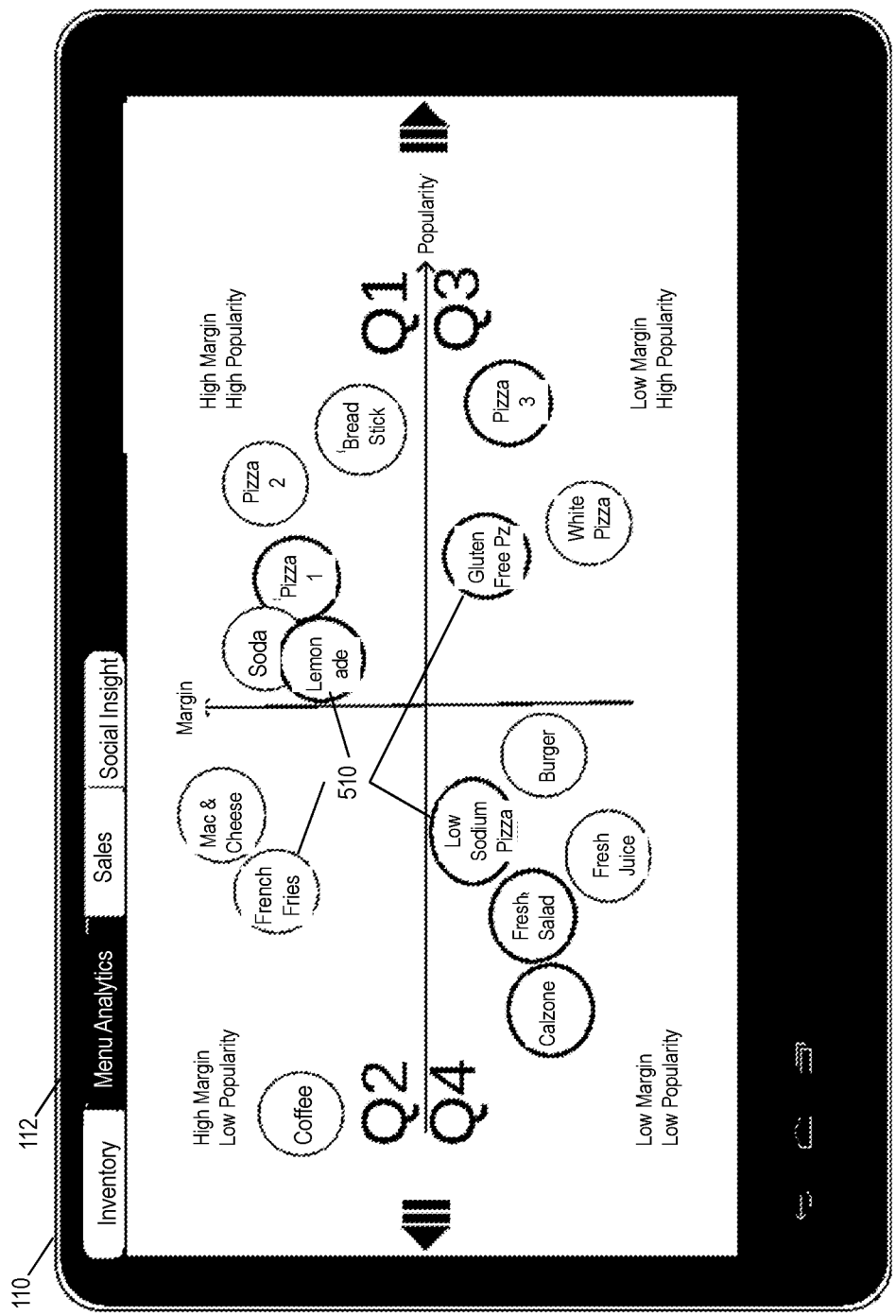
FIG. 5 depicts one or more screen captures of a question-answering system according to one or more embodiments of the present invention.
Figure 6:
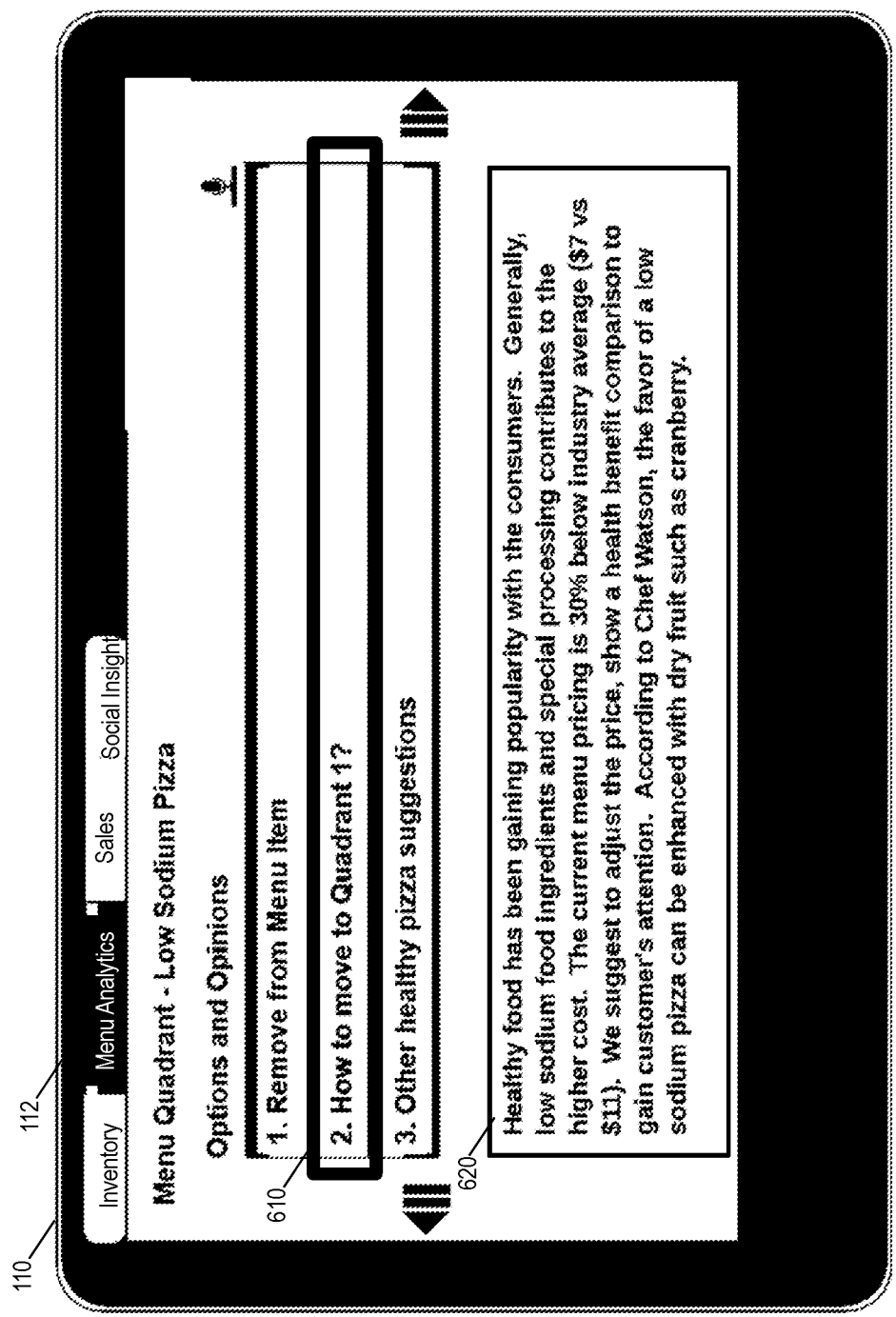
FIG. 6 depicts one or more screen captures of a question-answering system according to one or more embodiments of the present invention.

FIG. 5 and FIG. 6 depict one or more screen captures of a question-answering system according to one or more embodiments of the present invention. Here, an example scenario of a restaurant management is used as a problem domain. As depicted, the question-answer system 110 is provided with case information for analyzing menu items 510 of the restaurant according to popularity and profit margins. The menu items 510 are displayed via the user interface 112 separated into four quadrants of 1) high margin high popularity; 2) high margin low popularity; 3) low margin high popularity; and 4) low margin low popularity. It is understood that the example scenario is for explanation and embodiments of the present invention can be used in any other example scenario and problem domain.

FIG. 6 depicts another screenshot with the user interface 112 providing analysis of a menu item 510, in this case "low sodium pizza". The user 105, which can be a restaurant manager/owner and the like, can be provided an option to remove the menu item 510, which is in the low margin low popularity quadrant (Q4). The question-answering system 110 can also suggest different menu items to replace the menu item 510. Further, the user 105 can ask the question-answering system 110 a query 610, such as "how to move low sodium pizza to Q1 (high margin high popularity)?" In response, the question-answering system 110 provides an answer 620 with a suggestion to move the menu item 510 to Q1. In this case, the answer 620 suggests that to improve this menu item, the user should increase menu price and show a health benefit comparison to gain customer attention. It is understood that this is an example scenario and that the question and answer may not reflect real-world example.

As described earlier, the user 105 is not provided any rationale about the answer 620. For example, the rationale for the answer 620 may be that healthy eating is well accepted by consumers and that the price is 30% below the average price on the market.

The rationale generator 116, according to one or more embodiments of the present invention, determine such rationale and provide it to the user in a visual manner. For example, as described herein, during analysis for generating the answer 620, the answer generator 114 references one or more data sources 130 to obtain information. The obtained information is analyzed, merged/combined (based on a weight/ranking of data), removed (based on ranking). Eventually, the answer generator 114 produces the answer 620.

Figure 7:
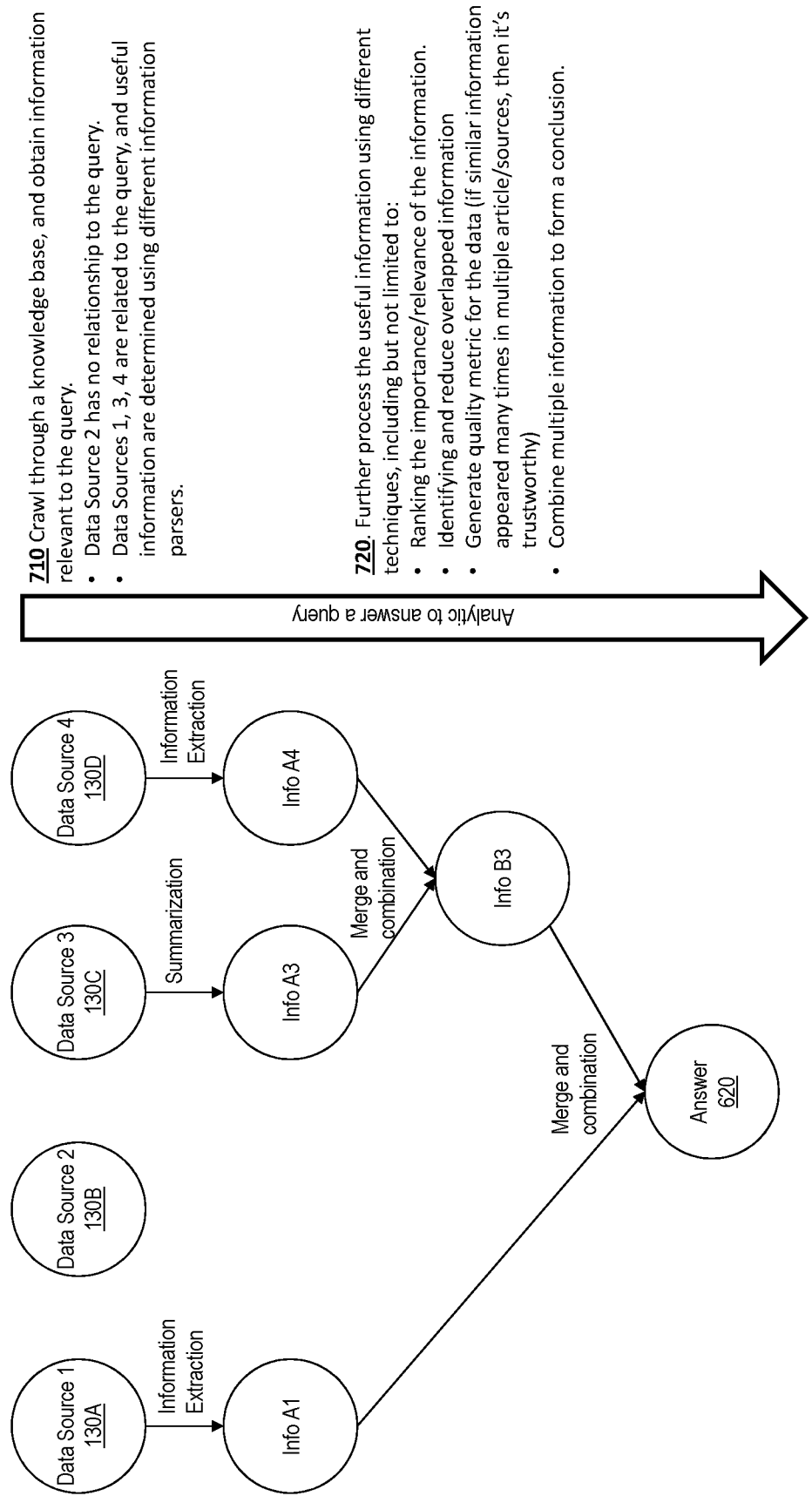
FIG. 7 depicts a flowchart of an example method for generating an answer and rationale to a user-provided question according to one or more embodiments of the present invention.

FIG. 7 depicts a flowchart of an example method for generating an answer and rationale to a user-provided question according to one or more embodiments of the present invention. The method includes determining the answer 620 to the user-provided query 610, which includes crawling through a knowledge base, and obtaining information relevant to the query, at 710. Obtaining the information includes determining one or more data sources 130 (e.g. data source 2 130B) that are not relevant to the query 610. Further, obtaining the information from the data sources 130 that are deemed to be relevant to the query. Determining the relevant data sources 130 can include using semantic analysis of query 610 and the one or more data sources 130 to identify similarity in the content of the query and the content of the data sources 130. For example, the similarity can be determined using keywords, and other language processing techniques. For example, one or more language processing services can be used, such as those available via IBM WATSON™, GOOGLE CLOUD™, and the like.

Further, the method includes processing the information obtained from the data sources 130, at 720. The information parses 120 can process the information using different techniques. For example, the information parses 120 can rank the importance/relevance of the information with respect to the query. For example, the ranking can be performed using a similarity coefficient between the query and a data source 130. For example, the similarity coefficient may include a number of common words between the query 610 and the data source 130. Other techniques to determine the similarity coefficient can be used in other examples.

Further, the information parser 120 can identify and reduce overlapped information among the different data sources 130. For example, the information parser 120 can compare a first data source 130A with a second data source 130C, and determine a similarity coefficient among the two data sources; if the similarity coefficient is above a predetermined threshold, the two data sources may be considered to contain overlapping information, and only one of the two data sources is used for generating the answer 620.

Further yet, the information parser 120 generates quality metric for the information that has been obtained from the data sources 130. For example, if similar information appeared at least a predetermined number of times in multiple data sources 130, then the information may be deemed trustworthy. The quality metric may reflect the trustworthiness of the information and may depend on factors such as the number of data sources providing similar information. The quality metric can also depend on the quality of the data sources 130 providing such information. For example, sources such as regulated news source, peer-reviewed journals, government sources/agencies, textbooks, can have a higher quality metric compared to blog posts, forums, and social media.

The information parsers 120 can further combine multiple information from various data sources 130 to form the answer 620. Combining/merging the information from multiple data sources 130 can include generating the answer 620 using natural language so that portions from the multiple data sources 130 are combined to form syntactically and semantically correct statements that are included in the answer 620. Accordingly, the answer 620 is obtained from the data sources 130 using artificial neural network(s).

With the increased usage of natural language input, it is a technical challenge for the question-answering system to accurately understand the user-provided question, not just syntactically and semantically, but also identify an intent of the query 610. The intent of the user-provided question, along with the syntax and semantics, can affect the data sources 130 to be used for generating the answer 620. Further, with the explosion of digital content, and the extent of manipulated data being available, especially in the digital environment, determining the trustworthiness of data sources 130 can be a technical challenge.

Accordingly, there is a technical challenge of using the right data sources 130 for generating the answer 620 by the question-answering system 110. In addition, a technical challenge exists to provide the user 105 an accurate information about which data sources 130 influence the answer generation, and what influence weightage is associated with the various data sources 130 that are used for generating the answer 620. Additionally, a technical challenge exists to adjust the data sources 130 that are being used by the question-answering system 110, for example by changing the influence weightage of one or more data sources 130.

According to one or more embodiments of the present invention the technical challenges are addressed by using the rationale generator 116 that provides the user 105 a depiction of the data sources 130 and their corresponding influence weightage in generating the answer 620. Further, the question-answering system 110 facilitates the user 105 to change the influence weightage of one or more data sources 130, to eliminate one or more data sources 130, or to add one or more data sourced 130 used for generating the answer 620. Accordingly, a revised answer 620 is generated with the adjusted data sources 130.

Figure 8:
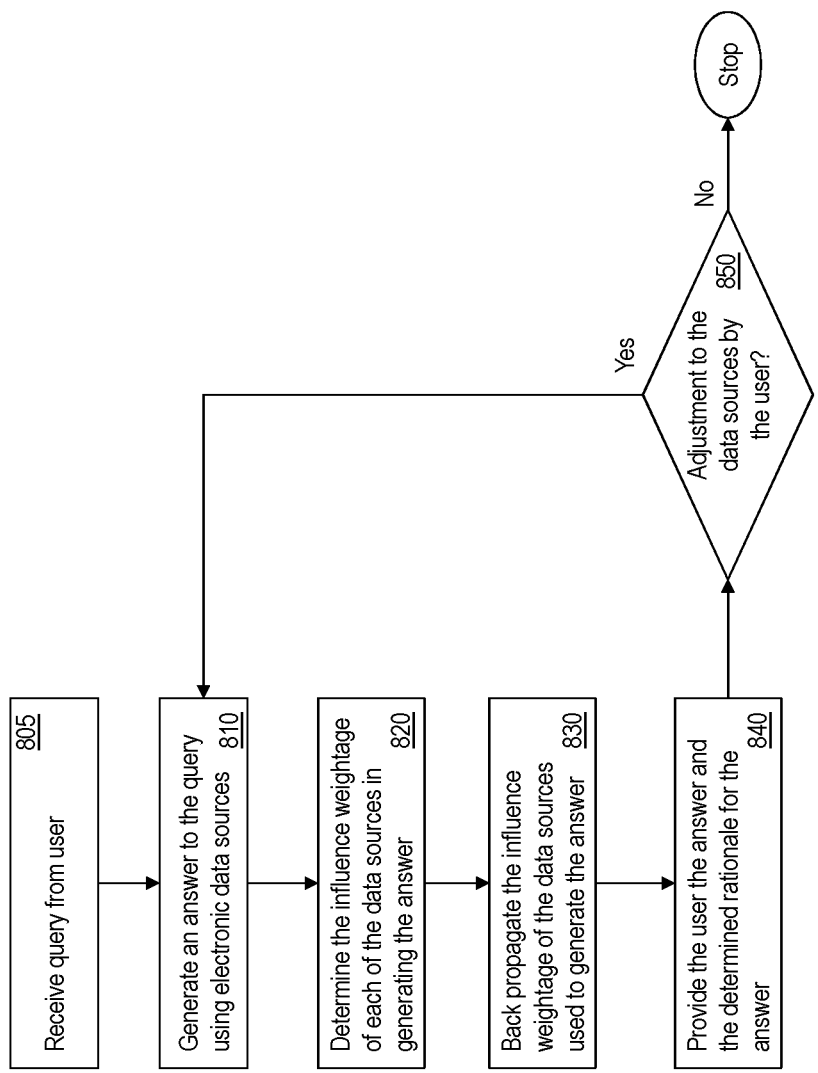
FIG. 8 depicts a flowchart of an example method for rationale generation for an answer generated by an electronic question-answering system according to one or more embodiments of the present invention.

FIG. 8 depicts a flowchart of an example method for rationale generation for an answer generated by an electronic question-answering system according to one or more embodiments of the present invention. The method includes receiving the query 610 from the user 105, at 805. The method further includes generating the answer 620 to the query 610 using the one or more data sources 130, at 810. The answer 620 is generated using an artificial neural network.

The method further includes determining the influence weightage for each of the data sources 130 in generating the answer 620, at 820. The influence weightage, in one or more examples, is provided by the answer generator 114. In one or more examples, the influence weightage of the data source 130A can represent a proportion of information from the data source 130A in the content of the answer 620. Alternatively, or in addition, the influence weightage can represent other factors that the answer generator 114 uses to generate the answer 620 from the data sources 130, the factors varying base on the answer generator 114 that is used.

Figure 9:
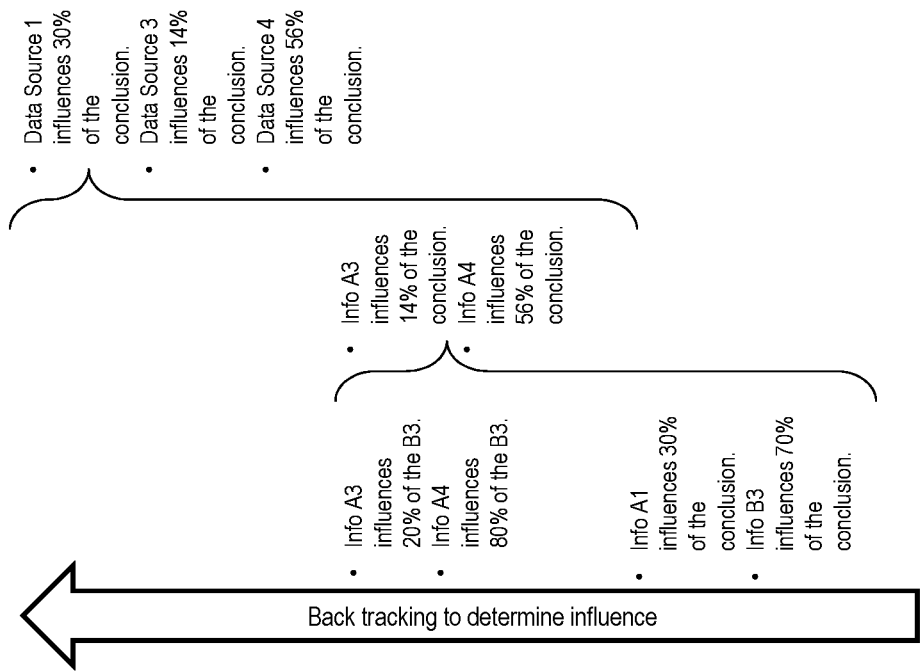
FIG. 9 depicts example influence weightages in an example scenario according to one or more embodiments of the present invention.
Figure 9:
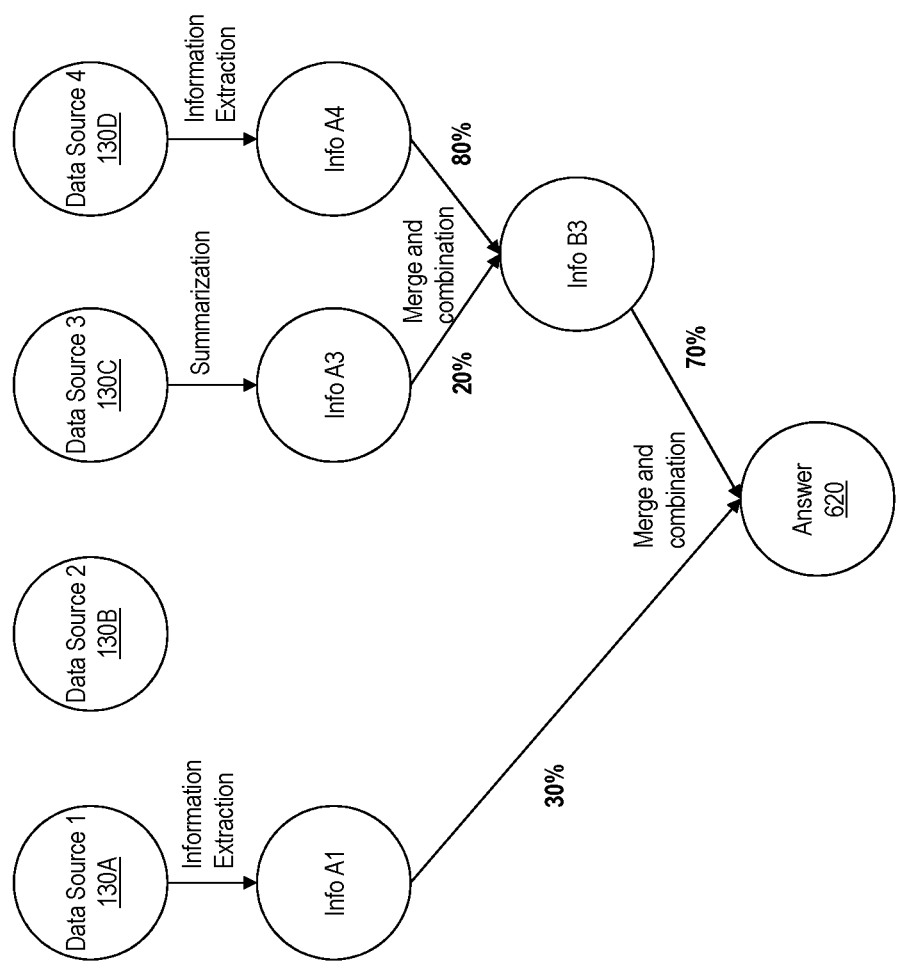

FIG. 9 depicts an example influence weightages in an example scenario according to one or more embodiments of the present invention. Consider that when generating the answer 620, the answer generator 114 assigns information A1 a 30% influence weightage and information B3 a 70% influence weightage, where the answer 620 is generated by combining/merging A1 and B3. Here, A1 is obtained from the first data source 130A; whereas, B3 is obtained from a combination of information A3 from a third data source 130C and information A4 from a fourth data source 130D. The generation of B3 includes assigning a influence weightage of 20% to A3 and 80% to A4. It is understood that the weightage values and combination of information above is just one possible example and that in other example scenarios different number of data sources, information, and influence weightage values are possible.

Referring to FIG. 8, the method further includes back propagating the influence weightage of the data sources 130 that are used to generate the answer 620, at 830. Accordingly, in this case, the rationale generator 116 determines that the first data source 130A has an influence weightage of 30%, the third data source 130C has an influence weightage of 14%, and the fourth data source 130D has an influence weightage of 56% in the generation of the answer 620. The influence weightage of the third data source 130C and the fourth data source 130D are reverse calculated from the influence weightage of 70% that is assigned to their combination. In this case, 14%=20% of 70% in the case of the third data source 130C, and 56%=80% of 70% in the case of the fourth data source 130D.

Further, the method includes presenting the answer 620 and the determined rationale for the answer 620 to the user 105, at 840. In one or more examples, the presentation includes a tree depiction of the data sources 130 and the corresponding obtained information with influence weightages as shown in FIG. 9. Further, the presentation can include a table or any other format for depicting the influence weightages of the data sources 130 in the generation of the answer 620.

The method accordingly improves the question-answering system 110 by providing such a rationale along with the answer 620 for the user 105 to understand how the question-answering system 110 reached the answer 620. The one or more embodiments of the present invention facilitate tracking the data sources 130 that the question-answering system 110 crawled through and used, as well as the intermediate data (information obtained by the information parsers 120) that is used for analyzing the query 610. The rationale generator 116 forms a relationship diagram between the data sources, the information obtained from the data sources 130 in the intermediate steps and conclusion. The relationship diagram is represented using a graph (FIG. 9), where each node represents data that is being input to a next step of answer generator 114. For each connected node and the extracted information, the influence weightage is calculated to represent a percentage of contribution from each input node to the output node. This percentage contribution of the nodes in the graph can be collapsed, such that the relative contribution of each of the data sources 130 to the final answer 620 can be determined.

The rationale and data sources 130 can be ranked or further analyzed/processed to generate a summary, or identify additional information to be attached. For example, an abstract of each of the data sources 130 can be provided to the user 105 as part of the rationale. The abstracts are automatically generated by summarizing the data sources. In one or more examples, an electronic link to access each of the data sources 130 is also included in the rationale. Other data associated with the data sources 130 can also be included in the rationale for the user 105.

Figure 10:
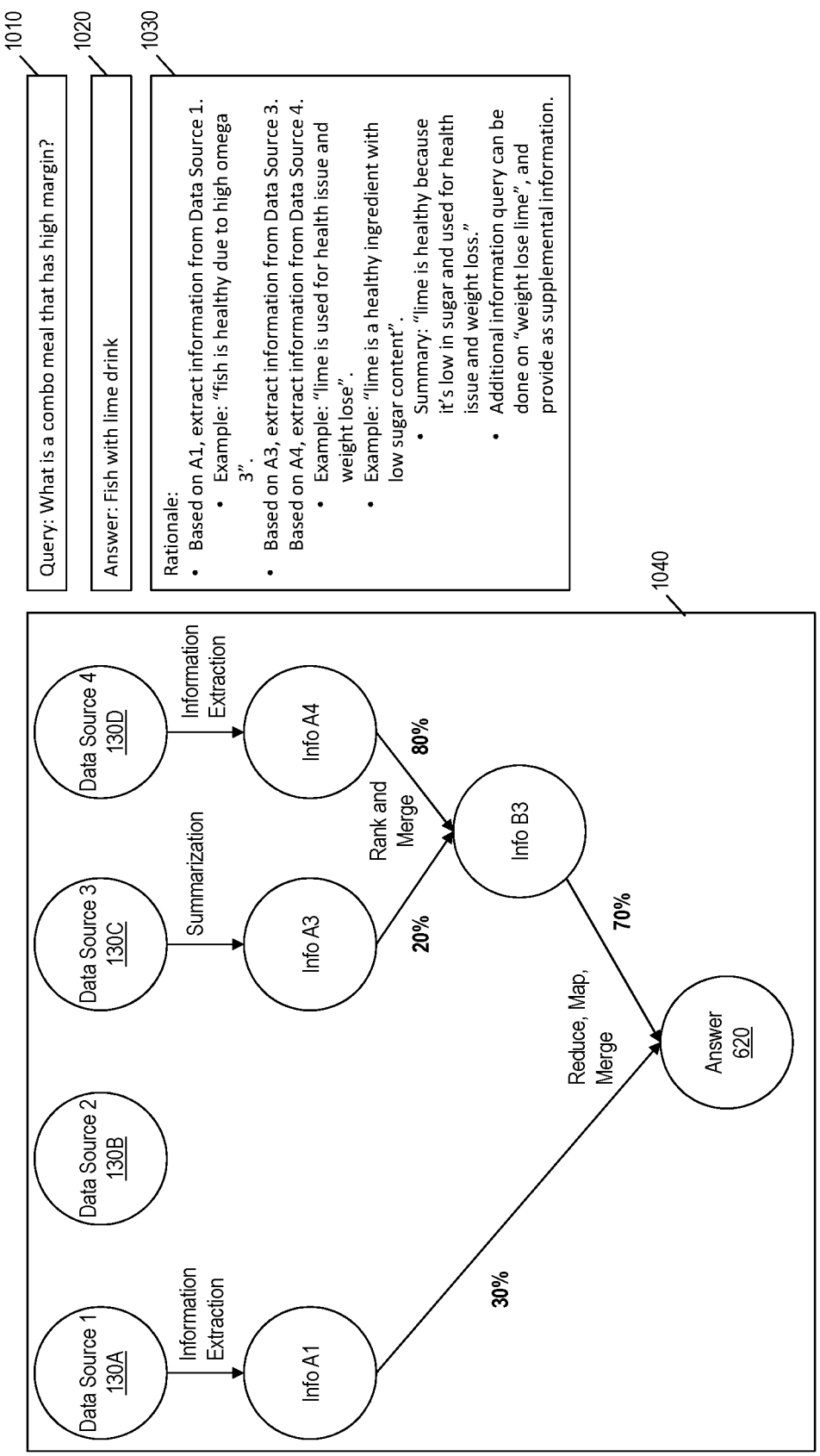
FIG. 10 depicts presenting an automatically generated answer with rationale according to one or more embodiments of the present invention.

FIG. 10 depicts presenting an automatically generated answer with rationale according to one or more embodiments of the present invention. Consider that in this case the user 105 provides a query 1010 that is "What is a combo meal that has high margin?" The question-answering system 110, in response, provides the answer 1020 of "Fish with lime drink." The question-answering system 110 that implements one or more embodiments of the present invention further provides a rationale 1030 that provides the user 105 with an explanation of how the data sources 130 were used to generate the answer 1020.

In one or more examples, the rationale 1030 is presented in conjunction with a graph 1040 that provides a visual depiction of the rationale 1030. The visual depiction includes a graphical representation of the operations performed on the data sources 130 by the information parsers 120 to obtain the answer 1020. In one or more examples, the visual depiction indicates each operation as a link between a pair of nodes, where data that is represented as an input node is converted into information that is represented by an output node by performing the operation that is represented by the link. The input node in such cases can be one or more data sources 130 and/or information instances, such as A1, A2, A3 obtained from the data sources 130. The operations can be any of the summarization, extraction, merging/combining, ranking, etc. that are performed by the neural network to obtain the answer 1020.

Consider the example content of the data sources 130 and corresponding extracted information to be as shown in Tables 1-3 herein. The information A1, A3, and A4, are respectively obtained from data sources 130A, 130C, and 130D using the information parsers 120. The information can include one or more keywords/phrases from the data sources 130. Based on the keywords/phrases, the information is classified into one or more categories, for example, "healthRationale", "cookingMethod", "drink" and the like. These categories can be used, in one or more examples, to generate or influence the query 610 (see FIG. 6). The categories are contextual and can vary based on the problem domain for which the query 1010 is asked. Because the query 1010 is about restaurant menu items 510, the categories, in this case, are related to the menu items 510.

Further, in this case, the answer generator 114 combines/merges the information A3 and A4 because both are about a common topic, in this case "lime." Here, the healthRationale category is included in both A3 and A4. The information can be combined in this case. The one or more categories of information are ranked to determine the answer 1020. For example, in this case the healthRationale of "lime" receives a rank of "9", whereas another drink, such as coffee may receive a rank of "20" (lower rank being better). Accordingly, "lime" drink has a relatively better rank than "coffee."

In this manner, for the query 1010, the rationale 1030 for the answer 1020 is presented that includes one or more extracted portions of the data sources 130 that are relevant to the answer 1020. The graph 1040 shows the one or more operations performed on the information and the data sources 130 to generate the answer 1020.

TABLE 1

Data source 1 is about fish. "Fish goes well with sour drink or wine. Fish can be cooked using batter fry, pan fry. Fish is high in omega."
Info A1: [ fish: [healthRationale: [omega3]] [drink: [sour drink, wine]] [cookingMethod: [ batter fry, pan fry ]]]

TABLE 2

Data source 3 is about lime and how different cultures have used lime for different health issues (such as sore throat).
Info A3: "[lime: [healthRationale: [health issue, weight lost]]]"

TABLE 3

Data source 4 is about low sugar, nutrients of lime and how lime is used in food preparation.
Info A4: "[lime: [healthRationale: [healthy ingredient]]]"
{"healthRationale" are ranked.}
Info B3: [lime: [ healthIndex: 9]].

Referring to the flowchart of FIG. 8, in one or more examples, the method further includes fine-tuning the rationale and the data sources 130 by the user 105, 850. For example, the data source 130C (about "lime") may be an article from an unverified source, or any other source that is considered non-trust-worthy by the user 105. Accordingly, the user might adjust the influence weightage of the data source 130C. For example, the influence weightage of 14% may be changed to 0 to "omit" that data source 130C as an input to generating the answer 1020. Alternatively, or in addition, the influence weightage may be adjusted to any other value that reduces the weightage further, which can change the ranking of "lime" to a value greater than the rank of "coffee", for example.

Figure 11:
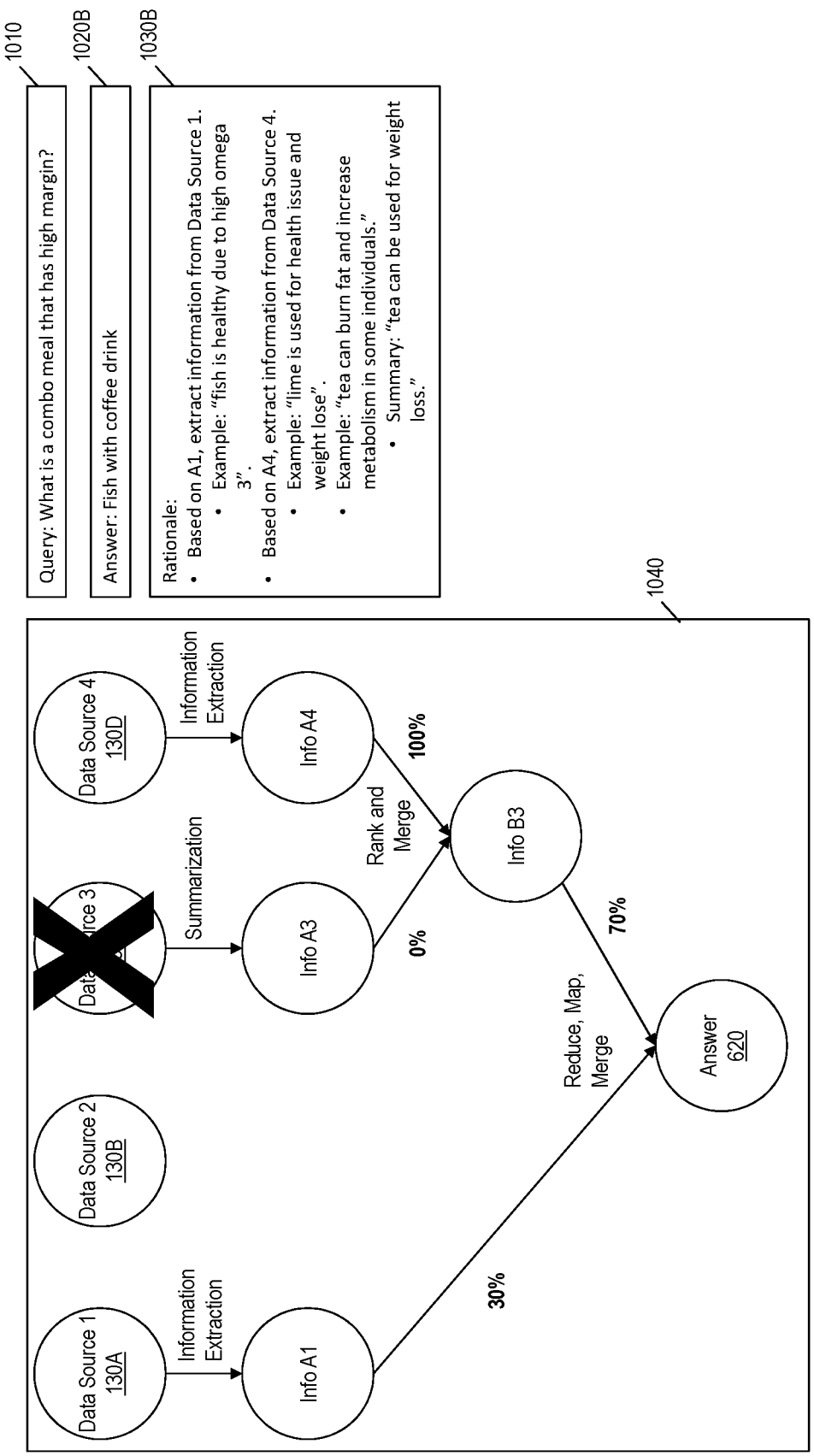
FIG. 11 depicts an example of adjusting influence weightage of data sources according to one or more embodiments of the present invention.

FIG. 11 depicts an example of adjusting influence weightage of data sources according to one or more embodiments of the present invention. The above example is depicted where the user 105 changes the influence weightage of the information A3 from the data source 130C to 0%. The rationale generator 116 automatically shows a visual indication of the data sources 130 being adjusted. In this case, an indication is provided that the data source 130C is now omitted from the answer generation.

In a similar manner, in one or more examples, the weightage can be adjusted in a positive manner; that is to increase the influence of that data source when generating the answer 1020.

Further, if the data sources 130 are adjusted in this manner, the question-answering system 110 generates a second answer 1020B and presents corresponding rationale 1030B. It should be noted that in one or more examples, even after adjusting the data sources 130, the answer 1020 may not change, just the rationale 1030 may change based on the data sources 130.

Accordingly, one or more embodiments of the present invention facilitate providing a rationale to an answer generated by a question-answering system that automatically generates answers to user-provided queries using one or more electronic data sources. The one or more embodiments of the present invention do not require a tailored parent-child algorithm to trace the rationale. This is important to note especially when the question-answering system uses neural network to generate the answer, because the decision made through the neural network may not be traceable. Rather, one or more embodiments of the present invention use data sources as input, and the information from the data sources is analyzed as a hierarchical data structure, such as a tree, where each tree node is an operation that operate (rank, extract, combine, merge etc.) on the information from the data sources.

Further, according to an aspect of one or more embodiments of the present invention relationships are identified between information in the data sources and the generated answer. Furthermore, the relationships are ranked according to the amount of the data. This facilitates the rationale to be generated in "Big Data" scenarios (such as WATSON™ in JEOPARDY™), where a lot of data is fed into a single algorithm, and the confidence level of the answer is based on number of references indicating the same answer.

Furthermore, one or more embodiments of the present invention provide summarized rationale based on the data sources together with the answer. Further, in one or more examples, the rationale includes one or more summaries from each level of node in the hierarchical structure. The presented rationale thus improves the question-answering system, such as by determining information that facilitates a user to understand the answer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    generating, by a cognitive system, an answer for a user-provided query using an analytics algorithm, the answer is based on a set of data sources;
    determining an influence weightage of each data source from the set of data sources;
    extracting text from at least one data source of the set of data sources;
    generating a rationale supporting the answer from at least one data source of the set of data sources, wherein the rationale comprises the text;
    combining the answer with the rationale based on the influence weightage; and generating and presenting the combined answer and rationale in a single cell of a user interface, wherein determining the influence weightage of each data source on the answer comprises back propagating to adjust the influence weightage of each operation performed in the analytics algorithm to obtain the answer, and wherein the rationale comprises a visual representation of the set of data sources and one or more operations performed to generate the answer.

2. The computer-implemented method of claim 1, wherein the rationale further comprises a summary of each data source from the set of data sources used to generate the answer.

3. The computer-implemented method of claim 1, wherein a data source from the set of data sources is one from a group of electronic data sources comprising books, articles, journal papers, social media posts, and blog posts.

4. The computer-implemented method of claim 1, wherein the answer is a first answer, the method further comprising:

adjusting, by a user, the influence weightage of a first data source from the set of data sources; and generating, by the cognitive system, a second answer for the user-provided query using the analytics algorithm, the answer is based on the set of data sources using the adjusted influence weightage.

5. The computer-implemented method of claim 4, wherein adjusting the influence weightage can omit the first data source from being used to generate the answer.

6. A system comprising:
a user interface;
a memory having computer readable instructions; and
one or more processors for executing the computer readable instructions, the computer readable instructions controlling the one or more processors to perform operations comprising:
generating an answer for a user-provided query using machine learning, the answer is based on a set of data sources;
extracting text from at least one data source of the set of data sources;
determining an influence weightage of each data source from the set of data sources, and generating a rationale for the answer based on the influence weightage, wherein the rationale comprises the text;
combining the answer with the rationale based on the influence weightage; and
presenting, by the use interface, the combined answer and rationale to a user in a single cell of the user interface,
wherein determining the influence weightage of each data source on the answer comprises back propagating to adjust the influence weightage of each operation performed in the analytics algorithm to obtain the answer, and
wherein the rationale comprises a visual representation of the set of data sources and one or more operations performed to generate the answer.

7. The system of claim 6, wherein the rationale further comprises a summary of each data source from the set of data sources used to generate the answer.

8. The system of claim 6, wherein a data source from the set of data sources is one from a group of electronic data sources comprising books, articles, journal papers, social media posts, and blog posts.

9. The system of claim 6, wherein the answer is a first answer, the method further comprising:

adjusting, by the user interface, the influence weightage of a first data source from the set of data sources; and generating, by the answer generator, a second answer for the user-provided query using the machine learning, the answer is based on the set of data sources using the adjusted influence weightage.

10. The system of claim 9, wherein adjusting the influence weightage can omit the first data source from being used to generate the answer.

11. A computer program product comprising a computer readable storage medium having stored thereon program instructions executable by one or more processing devices to perform a method comprising:

generating, by a cognitive system, an answer for a user-provided query using machine learning, the answer is based on a set of data sources;

determining an influence weightage of each data source from the set of data sources;

extracting text from at least one data source of the set of data sources;

generating a rationale for the answer based on the influence weightage, wherein the rationale comprises the text;

combining the answer with the rationale based on the influence weightage; and presenting the combined answer and rationale to a user in a single cell of a user interface, wherein determining the influence weightage of each data source on the answer comprises back propagating to adjust the influence weightage of each operation performed in the analytics algorithm to obtain the answer, and wherein the rationale comprises a visual representation of the set of data sources and one or more operations performed to generate the answer.

12. The computer program product of claim 11, wherein the rationale further comprises a summary of each data source from the set of data sources used to generate the answer.

13. The computer program product of claim 11, wherein a data source from the set of data sources is one from a group of electronic data sources comprising books, articles, journal papers, social media posts, and blog posts.

14. The computer program product of claim 11, wherein the answer is a first answer, the method further comprising:

adjusting, by a user, the influence weightage of a first data source from the set of data sources; and generating, by the cognitive system, a second answer for the user-provided query using the machine learning, the answer is based on the set of data sources using the adjusted influence weightage.

* * * * *